United States Patent [19]

Hoying et al.

[11] Patent Number: 4,840,358
[45] Date of Patent: Jun. 20, 1989

[54] HYDRAULIC ENGINE MOUNT WITH AIR BLADDER TUNING

[75] Inventors: John F. Hoying, Bellbrook, Ohio; Bernard Lange, Russelsheim, Fed. Rep. of Germany

[73] Assignee: General Motors Corporation, Detroit, Mich.

[21] Appl. No.: 173,848

[22] Filed: Mar. 28, 1988

[51] Int. Cl.⁴ .................................................. F16F 9/50
[52] U.S. Cl. .............................. 267/140.1; 248/566; 267/219
[58] Field of Search ............... 248/562, 566; 267/219, 267/220, 136, 140.1; 280/707

[56] References Cited

FOREIGN PATENT DOCUMENTS

| 138422 | 8/1982 | Japan | 267/140.1 |
| 0151638 | 8/1984 | Japan | 267/140.1 |
| 0233237 | 10/1986 | Japan | 267/140.1 |

*Primary Examiner*—Duane A. Reger
*Attorney, Agent, or Firm*—R. L. Phillips

[57] ABSTRACT

A hydraulic mount assembly is disclosed having expandable primary and secondary fluid chambers, an orifice track for damping action and a damping decoupler. During low level dynamic loading of the mount, hydraulic pressure activates the decoupler. At higher level loading, fluid passes through the orifice track between the two chambers providing the damping action. An expandable pneumatic bladder is mounted within the primary chamber. A control system including two one-way valves governs ingress and egress of outside air to the pneumatic bladder, thereby selectively reducing the overall damping and dynamic rate characteristics in response to sensed vehicle operating conditions. This reduction is accomplished by allowing the bladder to inflate with air providing a relatively soft, engine isolating mount. Alternatively, the control system allows controlled bladder deflation, selectively returning the mount to relatively hard characteristics. The inflation or deflation of the bladder is accomplished by the pumping action of the fluid within the hydraulic mount itself. The pressure within the bladder is maintained at a level below a maximum limit thereby assuring that the bladder does not over inflate, causing the mount to return to relatively hard characteristics.

3 Claims, 1 Drawing Sheet

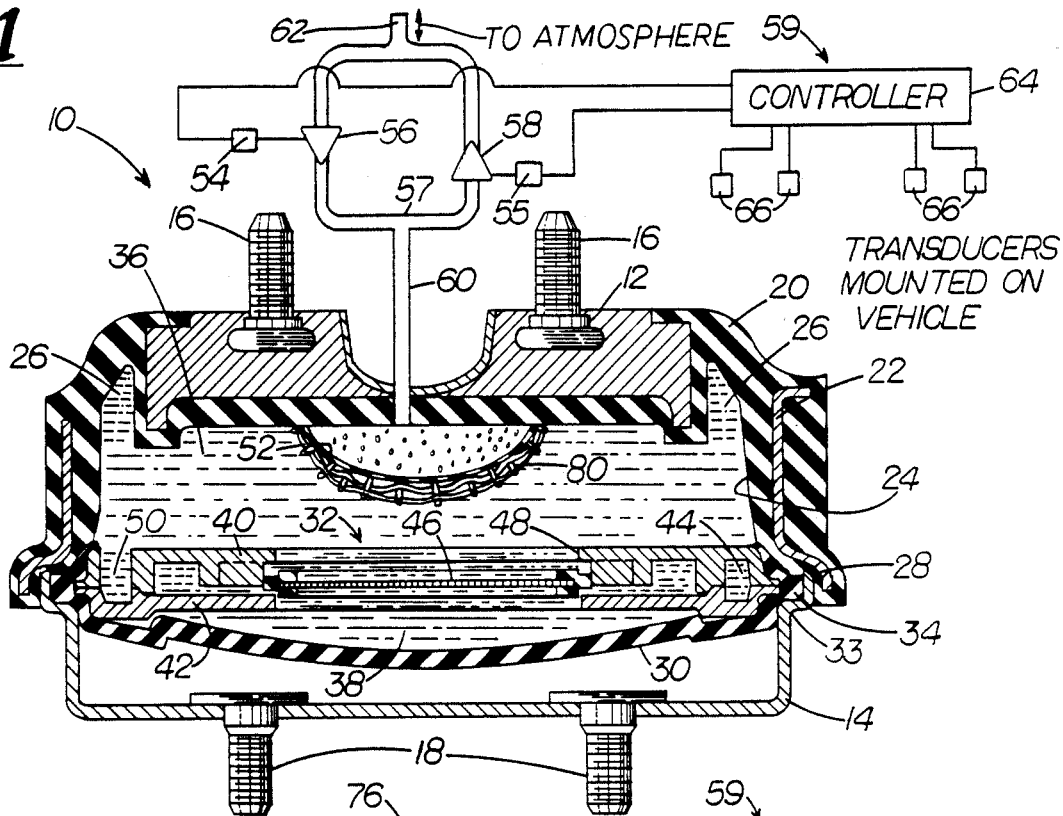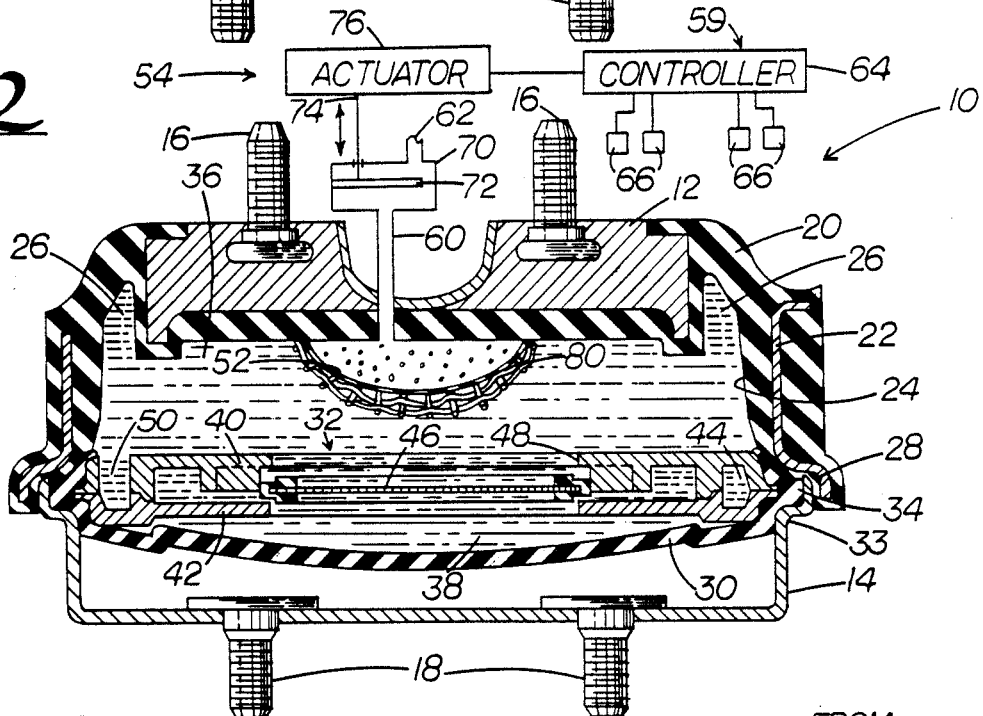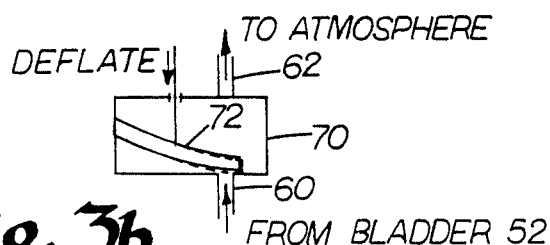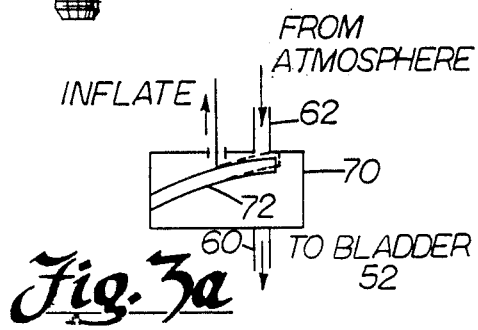

HYDRAULIC ENGINE MOUNT WITH AIR BLADDER TUNING

TECHNICAL FIELD

The present invention relates generally to hydraulic mounts for vibration damping and, more particularly, to a vehicle mounted hydraulic mount assembly containing an internal air bladder and a check valve control system designed to provide variable dynamic rate and damping characteristics.

BACKGROUND OF THE INVENTION

A variety of mount assemblies are presently available to isolate vehicle vibrations, such as for automobile and truck engines and transmissions. A popular mount in use today is the hydraulic-elastomeric mount of the type disclosed in U.S. Pat. No. 4,588,173 to Gold et al., issued May 13, 1986 and entitled "Hydraulic-Elastomeric Mount."

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the partition plate and the body. The secondary chamber is formed between the plate and the diaphragm.

A decoupler is positioned in the central orifice of the plate and reciprocates in response to the vibrations. The decoupler movement alone accomodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effects this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high volume, high velocity fluid flow through the orifice track, and accordingly a high level of damping force and smoothing action. The high inertia of the hydraulic fluid passing through the orifice track contributes to the relatively hard mount characteristic in this mode. As a third (intermediate) operational mode of the mount, medium amplitude inputs produce lower velocity fluid flow through the orifice track generally resulting in a medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the damping characteristics of the mount. Such a hydraulic mount is disclosed in the U.S. Pat. No. 4,756,513 to Carlson et al, issued on July 12, 1988 and entitled "Variable Hdraulic-Elastomeric Mount Assembly," assigned to the assignee of the present invention. This invention represents an improvement over previous mounts in that it provides variable damping levels in response to sensed vehicle operating conditions. This is accomplished by the use of an inflatable air bladder to selectively control the diaphragm movement from the secondary chamber side of the mount assembly. The inflation of the bladder is directed by an external control circuit and provides different levels of damping. This control circuit includes a series of vehicle mounted tranducers communicating with a preprogrammed microprocessor. The transducers supply vehicle/component vibration information to the microprocessor which in turn directs the operation of the bladder. The orifice track sizes/lengths as well as the control circuit are designed to conform to each vehicle application.

It has also recently been suggested to provide alternative damping control for tuning of the operation by regulating movement of the mount assembly by a compressible fluid (air) chamber on the primary chamber side. However, this concept, as illustrated in the German patent publication No. DE 3447746 A1, published July 7, 1986 (FIG. 5) generally provides only for increased stiffness, especially at high frequencies, since the air chamber is on the outside of the hydraulic chamber. That is, the German designed mount assembly can not be controlled to allow compression and/or controlled release of the air as an alternative to damping movement of the hydraulic fluid.

While these recently developed mounts are an improvement over the mounts of the prior art, they are thus not without limitations. At higher frequencies (over 20 Hz) the mounts still exhibit relatively high levels of damping and high dynamic rate and thereby provide only relatively hard characteristics. This is due to the described structure of the mounts. At these higher frequencies, relatively large damping fluid flows exhibiting high inertia forces still occur between the hydraulic chambers. Many times during vehicle operation, these high damping levels and dynamic rates are more than desired, resulting in an undesirable hard feel. With the prior art mounts, these high levels are simply not adjustable or tunable downwardly in order to obtain less damping and more engine isolation, that is sometimes desirable. Furthermore, the lower dynamic rate and damping especially at the higher frequencies can not be obtained by such conventional adjustment methods as changing orifice track sizes/lengths and/or decoupler shapes.

A recently developed mount includes an expandable pneumatic bladder mounted within the primary chamber. This hydraulic mount is disclosed in the copending Smith patent application, Air Bladder Controlled Hydraulic Engine Mount, Ser. No. 165,158 filed Mar. 17, 1988, assigned to the assignee of the present invention. During operation, the bladder is inflated to reduce high level damping and rate characteristics at higher frequency operation. A control circuit is included to control inflation and deflation either actively through use of an external pressure and vacuum source, or passively by the pumping action of the mount itself. Use of this mount has proven to be generally successful in providing improved control and operation. However, in the passive mode of operation where the bladder communicates directly with the atmosphere there is a need for a simple valving arrangement to provide a fine tuning of the mount.

A need exists therefore, for an improved hydraulic mount assembly including a simple, reliable control system providing variable damping levels during vehicle operation, including high frequency conditions. Such a mount would provide desirable operating characteristics and fine tuning throughout the entire range of vehicle operating conditions.

SUMMARY OF THE INVENTION

Accordingly, it is a primary object of the present invention to provide a hydraulic mount assembly overcoming the limitations and disadvantages of the prior art.

Another object of the present invention is to provide a hydraulic mount assembly including an internal pneumatic bladder that is tunable to provide variable damping characteristics so as to efficiently and effectively isolate vibrations and suppress noise over the entire range of vehicle operating and road conditions.

Another object of the present invention is to provide a hydraulic mount that includes an internal pneumatic bladder in the primary chamber which is passively inflated or deflated by the operation of the mount itself in response to vehicle vibrations thereby providing increased control of damping and dynamic rate and enhanced vehicle operating characteristics.

Yet another object of the present invention is to provide a hydraulic mount including an internal pneumatic bladder which when allowed to inflate at higher vehicle operating frequencies reduces both damping and dynamic rate so as to provide a relatively soft mount for better engine isolation.

Still another object of the present invention is to provide an improved control system for the hydraulic mount assembly utilizing one or more check valves which is simple, reliable and requires no external pressure source to inflate the bladder.

An additional object of the present invention is to provide a hydraulic mount assembly having an internal pneumatic bladder and a control system which limits the maximum internal pressure within the bladder, avoiding bladder over pressurization and a return to hard characteristics.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a tunable hydraulic mount assembly including an internal pneumatic bladder and check valve control system is provided for damping and isolating engine and transmission vibrations. The preferred embodiment of the mount assembly selected to illustrate the invention includes a pair of mounting members connected to each other through a hollow elastomeric body. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm. The partition further includes a decoupler and a fluid passage or orifice track connecting the two chambers.

A pneumatic bladder is provided in the primary chamber of the mount. When inflated, this bladder serves to reduce not only the damping level but also the dynamic rate of the mount. The bladder is allowed to passively inflate/deflate by the pumping action of the mount working through a check valve control system. Advantageously, by tuning the damping and dynamic rate characteristics of the mount to sensed actual vehicle vibration and operating conditions, more efficient and effective vibration and interior noise suppression is possible. For example, the hydraulic mount may be tuned back and forth between a relatively "soft" condition of low damping and low rate for best engine isolation and a relatively "hard" condition of high damping and high rate for best engine control, as required for maximum performance-type driving.

In operation of the mount, vibration forces within the design amplitudes and frequencies of the mount produce alternate contraction/expansion of the primary chamber. When the vibration is initiated, the liquid first causes reciprocation of the decoupler. Certain small vibratory amplitudes usually produced at high frequencies; for example, such as during smooth engine idling, are thus accomodated by the alternate increases and decreases in the chamber volumes resulting from decoupler reciprocation. As a result, significant fluid flow through the restricted passage or track between the chambers, and therefore damping is avoided.

In contrast, during large vibratory amplitudes, the decoupler ceases reciprocating and all damping fluid flow occurs between the primary and secondary chambers. This flow is through the orifice track in the partition. The resistance to flow of the hydraulic fluid and the fluid inertia provide the damping action.

Upon contraction of the primary chamber, liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency.

In carrying out its function of providing damping and dynamic rate reduction/tuning, the contraction or expansion of the pneumatic bladder in effect reduces the flow of hydraulic fluid between the two chambers. This is effective in reducing damping levels. In addition, at relatively high operating frequencies this same action allows the dynamic rate of the mount to be reduced to provide improved engine isolation. These high frequencies are engine induced and are usually greater than 16 Hz.

During operation, as the chamber volumes cycle, internal pressures cycle accordingly. In the preferred embodiment, these pressures typically reach a maximum 20 to 30 pounds per square inch (psi). The bladder is allowed to inflate to internal pressures less than the above pressures; that is, less than 20 psi. Since the bladder is filled with a compressible fluid (air in the preferred embodiment), some of the damping fluid compresses (or evacuates) the bladder and the rest travels through the orifice track back and forth to the secondary chamber. This happens because the compressed air in the bladder offers less resistance, and thus depending on the pressure, takes precedent over the normal hydraulic fluid movement. This results in less damping fluid flows between chambers providing lower damping and a softer mount.

According to an important aspect of the present invention, a control system is provided to govern the ingress or egress of air to the pneumatic bladder. In the preferred embodiment, two coupled one-way check valves are utilized. These check valves are oppositely mounted parallel to one another between the pneumatic bladder and the vent to the atmosphere. In the preferred embodiment, these valves are connected together through a double "Y" tube connection, thus requiring only a single tube entry into the bladder. In other words, air can enter and exit the bladder through the same tube, simplifying construction.

During operation, one valve is positioned to be active and the other is allowed to remain inactive. Being oppositely mounted, one valve when opened controls ingress to the bladder; whereas, the other valve when opened controls egress of air from the bladder.

The system takes advantage of the pumping action of the hydraulic mount itself. For example, in order to inflate the bladder, the control circuit operates so that the inflate check valve is activated, and the deflate valve deactivated. As the primary chamber volume pressure cycles below atmospheric pressure, atmospheric air enters the bladder through the inflate valve. As the primary chamber pressure cycles to above atmospheric, the air in the bladder is prevented from being forced back into the atmosphere by the check valve feature of the inflate valve. In this manner, inflation of the bladder and holding of the pressure can be accomplished. Better control and fine tuning is possible since the built up pressure is not immediately lost back to atmosphere once the internal pressure of the mount goes positive.

Deflation of the pneumatic bladder is accomplished in much the same manner. The inflate valve is deactivated and the deflate valve is activated. As the primary chamber pressure increases above atmospheric pressure, the air in the bladder is forced to escape through the exit valve. As the primary chamber pressures fall below atmospheric, the check valve prevents air from reentering the bladder.

Vehicle mounted transducers are provided in order to sense vehicle operating conditions and vibrations. The information obtained from the transducers is sent to a preprogrammed microprocessor controller which operates the valve actuators to modulate the pressure, thus providing variable damping characteristics in response to sensed vehicle operating conditions.

In an alternative embodiment, the two check valves are replaced by a single bi-directional check valve or flapper valve. This valve has first and second operating positions alternatively letting air in or air out of the bladder, respectively.

Either valve embodiment can be mounted internally to the mount or externally on some other part of the vehicle. Advantageously, placing the valve within the mount assembly simplifies installation by reducing the number of external components. Additionally, the same elastomeric material used in fabricating the mount is well adapted for use as the internal flapper of the alternative embodiment.

As another feature of the invention the control system maintains the volume of the pneumatic bladder below a predetermined maximum limit. It has been found in working with prior art mounts and allowing the pneumatic bladder volume to increase beyond the limit, the mount returns to relatively hard characteristics. Specifically, when the bladder volume and its associated pressure increases to a value beyond which the cycling internal pressures of the mount attain, the primary chamber internal pressure can no longer compress the bladder. This returns the mount to relatively hard characteristics.

In one embodiment, the means for limiting the bladder volume/pressure includes providing a self-relieving type entry check valve. A valve of this type allows air to enter and prevents it from escaping up to the design volume limit. If the maximum volume/pressure of the bladder as indicated through design considerations is already exceeded, the self-relieving aspect of the valve holds the valve open until the volume/pressure falls below the maximum limit. Other means of limiting maximum volume/pressure are possible. For example, the embodiment illustrated as the preferred way of accomplishing this function is a screen in the primary chamber to enclose and physically limit the expansion of the bladder.

In either embodiment, the overall damping and rate characteristics of the mount are lessened at higher frequencies due mainly to smaller inertial forces in the fluid as a result of compressing the pneumatic bladder. These smaller inertial forces correspondingly produce less fluid flow through the orifice, resulting in lower damping. This avoids the undesirable high frequency hard characteristic of the mounts of the prior art. By limiting the maximum volume/pressure of the pneumatic bladder, a reduction in damping and rate is assured, and a disadvantageous return to hard mount characteristics is avoided. Accordingly, the mount is positively tuned to provide optimum damping and dynamic rate characteristics over all vehicle operating conditions.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing:

FIG. 1 is a cross sectional view of the hydraulic mount assembly, including the control system of the present invention;

FIG. 2 is a cross sectional view of the hydraulic mount assembly including an alternative embodiment of the control system;

FIG. 3A shows the flapper in the check valve of the alternative embodiment in the inflate position, the phantom lines illustrating the checking position;

FIG. 3B shows the flapper in the check valve of the alternative embodiment in the deflate position, the phantom lines illustrating the checking position.

DETAILED DESCRIPTION OF THE INVENTION

Reference is now made to the drawing FIGS. 1 and 2 showing the preferred and an alternative embodiment of improved hydraulic-elastomeric mount assembly 10 of the present invention respectively. The dynamic characteristics of the mount assembly 10 of the present invention, may be adjusted or tuned to meet the specific vehicle application. As a result, the desired amplitude control, as well as the coefficient of damping and resulting dynamic rate best suited to isolate a particular vibration condition, can be obtained. The mount assembly 10 can of course be used in applications other than engine mounts, where controlled damping of vibration is desired especially with a reduced damping action at high frequencies.

The mount assembly 10 shown in FIG. 1 includes a cast metal mounting member 12 and stamped sheet metal mounting member 14. The mounting members 12 and 14 have a pair of mounting studs 16, 18, respectively. These studs 16, 18 project outwardly from the mounting members 12, 14 for attachment respectively to an engine (not shown) and an engine supporting cradle or frame of a vehicle (not shown).

A hollow elastomeric body 20 interconnects the mounting members 12, 14. The body is constructed of natural or synthetic rubber. More specifically, the body 20 may be molded to and about the mounting member 12 and includes an embedded stamped sheet metal retainer 22.

The body 20 defines a hollow cavity 24 for receiving a damping liquid, such as commercial engine antifreeze/coolant. Oppositely located voids 26 are formed in the body between the mounting member 12 and the retainer 22. These voids 26 provide directional dynamic rate control within the elastomeric body 20 itself and form a part of the damping liquid cavity 24. As is known in the art, such voids 26 are especially useful in isolating certain internal combustion engine vibrations.

Together, the mounting member 12, elastomeric body 20 and metal retainer 22 form a first subassembly or cover of the mount assembly. The retainer 22 includes an outwardly projecting collar 28 at its lower periphery. The collar 28 is formed to receive a second subassembly or base. The base comprises the mounting member 14 and elastomeric diaphragm 30 of natural or synthetic rubber and a partition 32 with flow orifices.

The elastomeric diaphragm 30 includes an annular rim portion 34 having a peripheral groove formed between upper and lower shoulders respectively. The shoulders are flexible so as to receive the outer edge of the partition 32. Thus, the partition 32 is sealingly engaged by the shoulders on opposite sides of the groove.

The mounting member 14 is formed with a collar 33 to receive the rim portion 34 of the diaphragm 30. Collar 33 of member 14 fits within collar 28 of the retainer 22. As is known in the art, tabs (not shown) may be provided on the collar 28 and bent over to retain and seal the whole mount assembly.

The elastomeric diaphragm 30 closes the elastomeric body 20 so as to form therewith the closed damping cavity 24. This cavity 24 is divided by the partition 32 into a primary chamber 36 enclosed by the elastomeric body 20 and a secondary chamber 38 enclosed by the diaphragm 30.

The partition 32 is formed of non-magnetic material, and includes a pair of plates 40, 42 with matching peripheries. Plates 40, 42 span the cavity 24 and cooperate to define a damping orifice track 44 interconnecting the chambers 36, 38.

A decoupler 46 in the form of a rectangular plate formed of metal or plastic is positioned in a central opening 48 in the plates 40, 42. The decoupler 46 is mounted for limited up and down reciprocal movement in the partition 32. The respective upper and lower faces of the decoupler 46 are directly engaged by the damping liquid within the primary and secondary chambers 36, 38. As a result, the decoupler 46 provides reciprocating movement in response to minimum amplitude alternating pressure build-ups in the chambers 36, 38 acting on opposite faces of the decoupler. This reciprocating movement within the plates 40, 42 toward and away from the chambers 36, 38 produces a limited volume change in primary and secondary chambers that effects hydraulic decoupling.

The flow passage or orifice track 44 is provided in the partition 32 to provide a flow of damping fluid between the primary and secondary chambers 36, 38 respectively. As shown, orifice track 44 communicates between the two chambers via opening 50 in plate 40 and an orifice in plate 42 (not shown). The length of track 44 can be fine tuned to the particular resonance frequencies of the component being damped.

During relatively smooth operation, such as during smooth engine idling, low amplitude high frequency vibrations are produced. The decoupler 46 reciprocates in response to these low amplitude vibrations and the mount provides very little damping effect.

As vibration amplitudes and frequencies increase, the decoupler reaches the limit of its travel. At this point, damping fluid flow is initiated and flow occurs along the orifice track 44. This hydraulic fluid flow provides the standard damping action.

In accordance with the present invention and as is shown in FIGS. 1 and 2, to provide reduction in damping and dynamic rate at the higher frequencies, (greater than 16 Hz) a pneumatic bladder 52 is provided inside the primary chamber 36 of the mount assembly 10. By controlling the inflation, and deflation (such as by compression and/or evacuation), the high frequency damping rate of the mount is effectively reduced. During operation, when the bladder 52 is inflated, some of the increased internal hydraulic pressure in the primary chamber 36 is expended by compressing the air in the bladder 52. Since the air is relatively easy to compress as compared to the damping movement of the hydraulic fluid, less hydraulic fluid flow occurs through orifice track 44. On the return stroke, the bladder 52 is enlarged to its original size, thus reducing the amount of hydraulic fluid that must be returned from the secondary chamber 38, and again reducing the damping effect. As a result, the damping level in both directions is reduced.

Advantageously, this concept represents a significant improvement over the mounts of the prior art. This is because the above reduction in damping levels at high frequency can not be readily achieved by changing the physical structure (orifice size, decoupler shape) of the mount itself. Only by employing the concepts of the present invention can such an advantageous reduction be effected.

To achieve the controlled pressurization of pneumatic bladder 52 as shown in FIG. 1, a control system is provided. The control system includes a pair of solenoids 54, 55 connected to control the activation of inflate and deflate check valves 56 and 58, respectively. The solenoids are a part of an electrical control circuit 59.

Air transfer tube 60 provides fluid communication between the check valves 56, 58 and the pneumatic bladder 52. Check valves 56 and 58 communicate directly with the atmosphere through vent tube 62. A double "Y" tube connection 57 is provided to connect the valves 56, 58 so that only a single tube 60 entering the bladder is required.

The control circuit 59 includes a pre-programmed microprocessor controller 64. The controller 64 receives vehicle and engine vibration information from vehicle mounted transducers 66, and thus directs the operation of check valves 56 and 58 in accordance with its programming.

During operation, the control circuit 59 responds to high frequency vehicle vibrations by allowing pneumatic bladder 52 to inflate. To do this, the control circuit activates inflate check valve 56. Deflate valve 58 remains deactivated. As the internal pressures of the primary chamber 36 cycle, to below atmospheric pressure, air flows from the atmosphere through vent tube 62 through inflate valve 56 ultimately into pneumatic bladder 52. Air is prevented from escaping from the bladder 52 by the check valve feature of inflate valve 56. Deflate valve 58 remains deactivated, preventing air from escaping through this separate path.

As a result of the vibrations imposed on the mount assembly 10, the air in bladder 52 is compressed by the hydraulic fluid in the primary chamber 36. Ultimately, less hydraulic fluid flows along the orifice track 44 thereby providing a softer mount. Advantageously the programming of the control circuit 59 is individually tailored to each specific vehicle and engine application. It should be pointed out, that means other than electromechanical (solenoid) can be used to activate the inflate and deflate check valves 56 and 58. For example, pneumatic means can be used as well.

The control circuit 59 can also selectively deflate bladder 52, progressively returning the mount to relatively hard characteristics. This is desirable when vibration frequencies diminish. This is accomplished simply by reversing the inflate/deflate valve operation set up. In other words inflate check valve 56 is deactivated and deflate check valve 58 is activated. In this manner, air is allowed to escape to the atmosphere, progressively reducing the pressure in pneumatic bladder 52.

FIG. 2 illustrates an alternative embodiment of the present invention wherein a single, dual action check valve 70 having an internal flapper 72 is utilized in place of the dual valve set-up in the preferred embodiment. As in the preferred embodiment, an air transfer tube 60 provides fluid communication between the check valve 70 and the pneumatic bladder 52. Vent tube 62 provides fluid communication between the atmosphere and check valve 70.

Reference is directed to FIGS. 3A and 3B showing the operation of check valve 70. As is shown in the Figures, actuating rod 74 is attached to flapper 72. Valve actuator 76 directs the operation of actuating rod 74. Actuator 76 can be either electromechanically or pneumatically operated. As shown in FIG. 2, actuator 76 works in response to the control circuit 59. As in the preferred embodiment, control circuit 59 includes controller 64 ad vehicle mounted transducers 66 to sense vehicle vibrations.

As shown in FIG. 3A, to inflate the pneumatic bladder 52, rod 74 is upwardly biased by actuator 76, causing flapper 72 to initially close the connection to vent tube 62 (note phantom line position). In this activated mode, as bladder 52 pressures decrease, atmospheric air flows through vent tube 62 around flapper 72 to transfer tube 60, ultimately entering bladder 52. Flapper 72 is fabricated of a resilient material and can be the same elastomeric material used in fabrication of the mount. This resiliency provides the checking feature of check valve 70. In other words, as bladder pressures 52 increase and air is forced back into check valve 70, the flapper 72 deforms sufficiently under the air pressure to close the opening to vent tube 60. This allows air to enter but not to escape. (see phantom lines in FIG. 3A.)

Similarly, FIG. 3B illustrates the check valve 70 in the deflate mode. In this mode, the resilient flapper 72 is biased downwardly. This allows air to escape from bladder 52, but as the atmospheric air tries to enter tube 60 in the reverse direction, the flapper 72 covers the entry orifice (note phantom line position).

FIG. 2 shows the check valve 70 positioned externally to the mount assembly. It should be pointed out however, that check valve 70 can also be molded into the elastomeric body of the mount itself. This concept of an integrally formed component with the elastomeric body 20 is also applicable to the forming of the bladder 52. This simplifies installation and is more cost effective because fewer components are required.

During operation, the control system of the invention maintains the volume of the pneumatic bladder 52 below a predetermined maximum limit. Because of the elastic nature of the bladder 52, as well as the pressurized surrounding hydraulic fluid, the pneumatic pressure in the bladder 52 is substantially proportional. It has been determined that if this maximum volume/pressure limit is exceeded, the mount returns to relatively hard characteristics. This is because the bladder volume and its associated pressure can increase to a value beyond which the cycling internal pressures of the mount can compress. In other words, the primary chamber internal pressure is no longer sufficient to compress the bladder 52, thereby negating the value of providing the bladder in the first place.

In one embodiment, the means for limiting these parameters includes providing a self relieving type inflate check valve (not shown). This allows air to enter bladder 52 through check valve 56 up to the designed volume/pressure limit. Once the limit has been exceeded, the self relieving aspect of the valve holds it open to atmosphere until the volume/pressure falls below the maximum limit. This limiting means actually shown as the preferred embodiment includes an internal screen 80 within primary chamber 36 to physically limit the expansion of bladder 52.

During manufacture of the mount assembly 10, an appropriate level of pre-stress is applied to represent the design static load as the filling with hydraulic fluid takes place. Thus, when loaded in use and no vibration force is interposed, the bladder 52 is expanded and filled with air in readiness for inflation/deflation as necessary. Normally, the bladder 52 is formed integrally with the elastomeric body 20, and has sufficient stiffness to assist in expansion to and holding of the neutral position. If necessary, however, a spring (not shown) can be interposed between the upper wall of the primary chamber 36 and the inner wall of pneumatic bladder 52. This spring (not shown) would serve to assist bladder 52 to inflate.

In summary, there are significant benefits gained from employing the concepts of the present invention. The hydraulic mount assembly 10 employs a variable damping system including a pneumatic bladder 52 in the primary chamber 36 serving to adjust and/or reduce the damping characteristics of the mount assembly especially at higher operating frequencies. The inflation and deflation of the bladder 52 is governed by the control system which includes inflate and deflate check valves 56, 58 and control circuit 59 to operate them. In an alternative embodiment, a single, dual action check valve 70 is provided including a two-directional internal flapper 72. In either embodiment, means may be included to prevent the expansion of bladder 52 beyond a pre-determined maximum limit. It has been found that once this limit has been exceeded, the mount returns to relatively hard characteristics. Accordingly, the control system maintains the bladder 52 internal pressure below this pre-determined maximum limit. In this manner, optimum vibration response and fine tuning is assured.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly, comprising:
   a pair of mounting members;
   a hollow body connected to said mounting members;
   a resilient diaphragm closing said hollow body and forming therewith a closed cavity that is filled with hydraulic fluid;
   means for partitioning said cavity into a primary chamber and a secondary chamber enclosed by said diaphragm;
   an expandable pneumatic bladder mounted within said primary chamber;
   communication means for communicating said bladder solely with the atmosphere, and;
   check valve means mounted within said communication means to control the flow of air between said bladder and the atmosphere;
   whereby the bladder is passively inflated and deflated by operation of the mount assembly itself and the damping and dynamic rate characteristics of the hydraulic mount may be controlled by said check valve means to provide optimum vehicle operating characteristics.

2. A hydraulic mount assembly, comprising:
   a pair of mounting members;
   a hollow body connected to said mounting members;
   a resilient diaphragm closing said hollow body and forming therewith a closed cavity that is filled with hydraulic fluid;
   means for partitioning said cavity into a primary chamber and a secondary chamber enclosed by said diaphragm;
   an expandable pneumatic bladder mounted within said primary chamber;
   communication means for communicating said bladder solely with the atmosphere;
   means for sensing vehicle operating conditions;
   check valve means mounted within said communication means to control the flow of air between said bladder and the atmosphere;
   means responsive to said sensing means for controlling said check valve means;
   whereby the bladder is passively inflated and deflated by operation of the mount assembly itself and the damping and dynamic rate characteristics of the hydraulic mount may be tuned by said check valve means especially at higher vibrational frequencies to provide optimum damping and engine isolation characteristics.

3. A hydraulic mount assembly, comprising:
   a pair of mounting members;
   a hollow body connected to said mounting members;
   a resilient diaphragm closing said hollow body and forming therewith a closed cavity that is filled with hydraulic fluid;
   means for partitioning said cavity into a primary chamber and a secondary chamber enclosed by said diaphragm;
   an expandable pneumatic bladder mounted within said primary chamber;
   communication means for communicating said bladder solely with the atmosphere;
   means for sensing vehicle operating conditions;
   check valve means mounted within said communication means to control the flow of air between said bladder and the atmosphere;
   means responsive to said sensing means for controlling said check valve means;
   means to limit maximum air pressure in said expandable bladder;
   whereby, the bladder is passively inflated and deflated by operation of the mount assembly itself and the damping and dynamic rate characteristics of the hydraulic mount may be controlled by the check valve means especially at high frequencies, to provide optimum vehicle operating characteristics.

* * * * *